Figure 1:
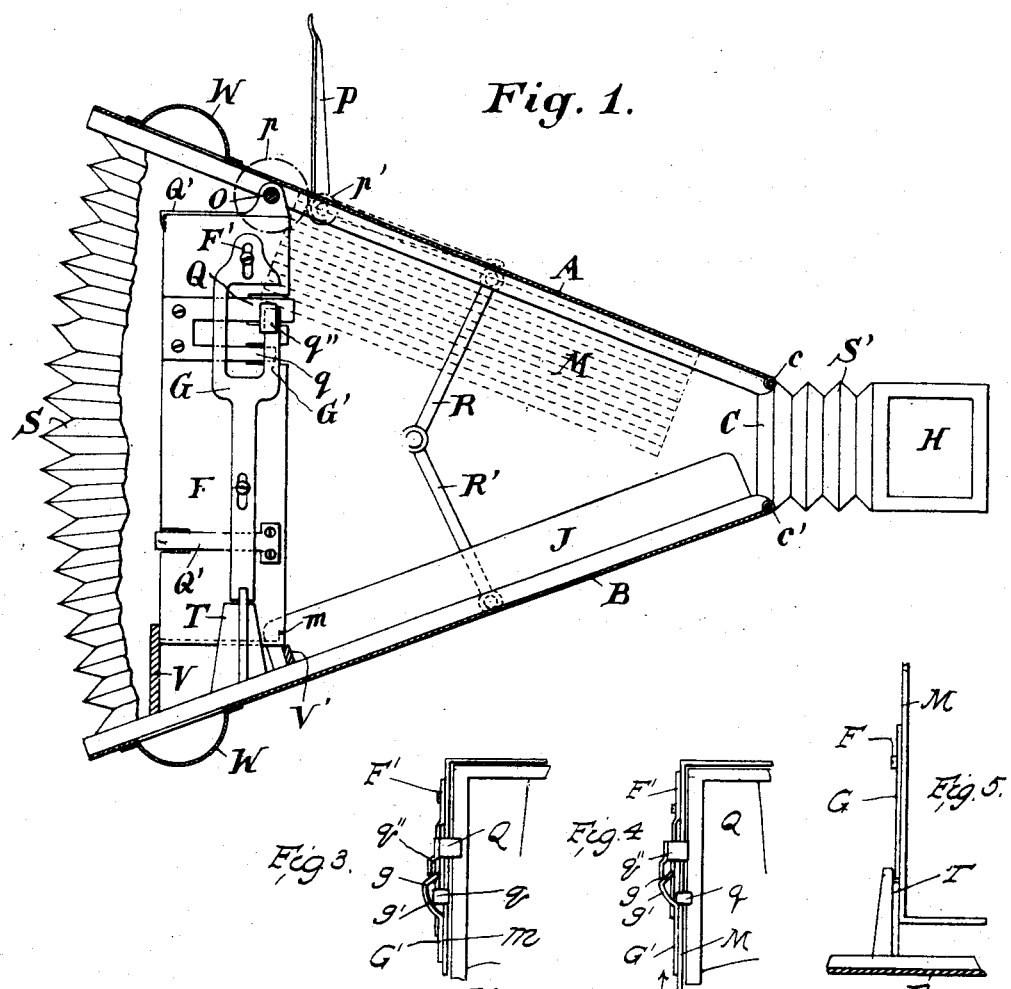

No. 683,978. Patented Oct. 8, 1901.
J. A. PAUTASSO.
PHOTOGRAPHIC CAMERA.
(Application filed Jan. 23, 1900.)

(No Model.)

WITNESSES.

INVENTOR
Jean Antoine Pautasso
BY
Richards & Co
ATTORNEYS.

THE NORRIS PETERS CO., PHOTO-LITHO., WASHINGTON, D. C.

UNITED STATES PATENT OFFICE.

JEAN ANTOINE PAUTASSO, OF GENEVA, SWITZERLAND.

PHOTOGRAPHIC CAMERA.

SPECIFICATION forming part of Letters Patent No. 683,978, dated October 8, 1901.

Application filed January 23, 1900. Serial No. 2,497. (No model.)

*To all whom it may concern:*

Be it known that I, JEAN ANTOINE PAUTASSO, a subject of the King of Italy, residing at Geneva, Switzerland, have invented certain new and useful Improvements in Photographic Cameras, of which the following is a specification.

The object of this invention is to produce a photographic camera for plates which on being folded can be reduced to a very small volume.

The invention is represented in the annewed drawings, which illustrate one form of the improved camera.

In the drawings like letters of reference indicate similar parts throughout the several views in which they occur.

Figure 2:
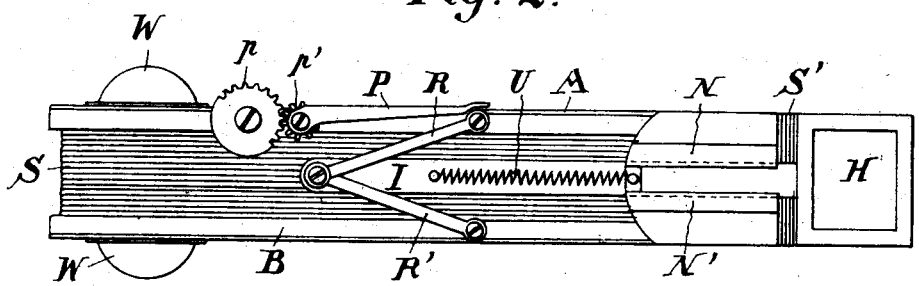

Figure 1 is a longitudinal section of the apparatus open provided with a magazine capable of containing a certain number of sensitive plates. Fig. 2 is a view of the apparatus closed. Figs. 3, 4, and 5 illustrate details of the apparatus.

A and B are two plates jointed by the hinges c c upon the sides of a frame C, forming the front of the apparatus, and joined by a bellows S on three sides. This bellows prevents the light from penetrating and when opened out forms the dark chamber of the apparatus. When folded up, it is retained between the plates A and B.

The lens and the lens-holder, with its mechanism, are placed in a box H, which may be directly hinged to the plates A and B or mounted upon the frame C by means of a bellows S' on four sides. This bellows is controlled by a rod I, working in the guides N and N', and by the rods R and R', which also serve to keep the plates A and B apart when the apparatus is open. A spiral spring U is attached by one of its ends to the rod I, while its other end is rigidly fixed in a convenient position upon the camera. It acts upon the rod I and tends to keep the apparatus open. The bellows S' might be replaced by a telescopic sheath, fulfilling the same object. As the lens, lens-holder, and sights can be of any usual form, they are not represented.

Under the plate A, Fig. 1, there is an axle O, the ends of which are carried in two bearings, and upon which is fixed a metal frame M, forming a magazine for a certain number (usually one dozen) of sensitive plates inclosed in light metallic frames. At the extreme ends of this axle O are fixed toothed wheels $p$, engaging with pinions $p'$, fixed on the turned-up sides of a lever P, which lever serves to work the magazine M. This lever by means of the wheels and pinions $p$ and $p'$ and the axle O can cause the magazine to describe a portion of a circle and occupy the two positions indicated on Fig. 1, the one in full lines and the other in dotted lines indicating the plates. In the first the sensitive plates are parallel to the focal plane of the lens, the first plate being focused ready to receive the impression. In the second the magazine is pressed against the plate A on the inside, the lever P pressing against it outside. When the magazine is in this position, the bellows may be folded, and the magazine is then held in the free space of the said bellows. The sensitive plates are held inside the magazine by spring-catches Q, $q$, and Q'. The spring-catches Q may be kept away from the lateral walls of the magazine by the forks G, placed upon these walls, the forks acting equally upon the spring-catches $q$, which are distant from the catches Q exactly the thickness of the frame of a sensitive plate, so that the first frame is held in advance by the catches Q, the catches $q$ touching the edges of the second frame, Figs. 3 and 4. The apparatus being open, the magazine M is held in its position by the tappets T. The stop V limits the travel backward, and the rods R, R', and I keep the bellows open. When it is shut, the magazine goes between the cheeks J, fixed upon the plates B. The introduction of the plates, each one carried in a frame, is effected when the bellows are folded by opening a sliding tap arranged on the outside face of the plate B. They are introduced into the magazine M, the sensitive face turned toward the plate A, and are stopped behind by the spring-catches Q' and in front by the spring-catches Q and by a small ledge $m$, projecting from the lower wall.

To operate the apparatus, the two plates A and B are opened, thus extending the bellows. Upon raising the lever P the magazine is pivoted until it rests between the tappets T, and the first plate is then in position to take an impression. The first plate having received an impression, the operator, leaving the magazine in the same position, presses upon the plate B. As the lower extremities of the forks G rest against the tappets T these forks rise up, guided by the slots F and F'. The branches G' of the forks then push aside the spring-catches Q in engaging under the pieces q'', fixed thereon, while the catches q are pushed inward. The branch G' possesses two inclined planes g and g' to work the spring-catches q and Q, as represented in Fig. 3, which shows the two extreme positions of one fork G. The first plate thus disengaged then falls between the cheeks J, while the second is held by the catches q. When the operator ceases to press upon the plate B, the forks G drop down under the pressure of the spring-catches Q and q, which return to their initial positions. The operator then slightly opens A and B to disengage the forks G from the tappets T, and by means of the lever P the magazine is pivoted until it comes against the plate A in the position indicated by dotted lines, when the apparatus is closed, thus bringing A and B together until they are parallel, as shown in Fig. 2. At this moment the plate which has been exposed and which by means of the cheeks J and a wall V' has been brought into a position corresponding exactly to that which the magazine has just been moved into is pressed against the spring-catches Q' and, pushing them aside, is forced against the other plates. As soon as it is in place the spring-catches resume their position and keep it against the other plates. The exposed plate has thus passed from the front to the rear of the magazine, the sensitive face being now turned, when the apparatus is opened, toward the rear of the apparatus, which renders a second exposure of the same plate impossible. The second plate is disengaged and ready to take an impression as soon as the apparatus is reopened and the magazine placed in front of the object-glass.

The apparatus may be used equally well for height and breadth by means of sights arranged in convenient positions.

Having thus described my invention, what I claim is—

1. A photographic apparatus capable of being folded up into a small compass, having a magazine for the plates capable of oscillating around an axle O whereby it will move in relation to the sides of the folding parts so as to come before the lens to expose the plates when the bellows are opened, the magazine lying normally in the space left free when the apparatus is closed, and being provided with a mechanism, fixed upon the sides thereof by means of which the plates can be operated from the outside in such a manner that the exposed plate shall pass to a position under the set of unexposed plates when the operator closes the apparatus, substantially as described and set forth.

2. In a photographic apparatus capable of being folded up into a small compass, a magazine M capable of being oscillated around an axle O by means of a lever P so as to come opposite the lens to expose the plates when the apparatus is opened, and being provided with a mechanism, by means of which the plates can be operated from the outside, this mechanism consisting of the catches Q, q and Q' and the fork G, and being so arranged in relation to the cheeks J and wall V' as to insure that the exposed plate shall pass to the position under the set of unexposed plates when the operator closes the apparatus, the face of the exposed plate being then turned toward the back of the apparatus to prevent a second exposure thereof taking place, substantially as described and set forth.

3. In combination with the folding sides carrying the bellows, a magazine arranged to fold in relation to the said folding sides, and means for releasing the plates from the front side of this magazine when the parts are unfolded and for transferring the same into the back of the magazine as the parts are folded, substantially as described.

4. In combination in a folding camera, a case comprising hinged box-sections, a frame to which such sections are hinged, flexible material connecting the box-sections, a lens-box movable toward and from the box-sections and means intermediate the box-sections and the lens-box whereby the movement of one will operate the other, substantially as described.

5. In combination the hinged box-sections, the flexible material connecting them, the guides, the lens-box having a portion moving in said guides, and means between the box-sections and lens-box for controlling the position of said parts, substantially as described.

In witness whereof I have hereunto set my hand in presence of two witnesses.

JEAN ANTOINE PAUTASSO.

Witnesses:
 ROB. SOLLBERGER,
 AL. BANOL.